(12) United States Patent
Hsieh

(10) Patent No.: US 12,530,477 B2
(45) Date of Patent: Jan. 20, 2026

(54) AUTHENTICATING A FILE SYSTEM WITHIN UNTRUSTED STORAGE

(71) Applicant: Google LLC, Mountain View, CA (US)

(72) Inventor: Yu-Ting Hsieh, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 172 days.

(21) Appl. No.: 18/267,667

(22) PCT Filed: Nov. 12, 2021

(86) PCT No.: PCT/US2021/059104
§ 371 (c)(1),
(2) Date: Jun. 15, 2023

(87) PCT Pub. No.: WO2022/132354
PCT Pub. Date: Jun. 23, 2022

(65) Prior Publication Data
US 2024/0111884 A1    Apr. 4, 2024

Related U.S. Application Data

(60) Provisional application No. 63/127,765, filed on Dec. 18, 2020.

(51) Int. Cl.
*G06F 21/62* (2013.01)
*G06F 21/60* (2013.01)
(52) U.S. Cl.
CPC ........ *G06F 21/6218* (2013.01); *G06F 21/602* (2013.01)
(58) Field of Classification Search
CPC ... G06F 21/6218; G06F 21/602; H04L 63/123
See application file for complete search history.

(56) References Cited

U.S. PATENT DOCUMENTS 8,199,911 B1    6/2012    Tsaur et al.
9,367,701 B2    6/2016    Merchan et al.
(Continued)

OTHER PUBLICATIONS

Heitzmann et al., "Efficient integrity checking of untrusted network storage," Storages '08 Proceedings of the 4th ACM International Workshop on Storage Security and Survivability, Alexandria, Virginia, USA, ACM, Oct. 31, 2008, pp. 43-54.

(Continued)

*Primary Examiner* — Abiy Getachew
(74) *Attorney, Agent, or Firm* — McDonnell Boehnen Hulbert & Berghoff LLP

(57) ABSTRACT

This document includes techniques, apparatuses, and systems for authenticating a file system (112) within untrusted storage (104). In particular, a file-system authenticator (108) generates a file-system root hash (206) corresponding to the file system (112) during a write operation. The file-system root hash (206) is uniquely determined based on contents of files within the file system (112) and a structure of the file system (112). The file-system root hash (206) can be readily updated, which enables the file system to support a dynamically-changing file system (112). Also, the size of the file-system root hash (206) is independent of the size of the file system (112) within the untrusted storage (104). As such, the size of trusted storage (110) used to store the file-system root hash (206) can be predetermined and fixed regardless of the size of the file system (112).

14 Claims, 12 Drawing Sheets

(56) References Cited

U.S. PATENT DOCUMENTS

| | | | |
|---|---|---|---|
| 10,788,957 B1* | 9/2020 | Lenzner | G06F 40/143 |
| 2007/0174921 A1 | 7/2007 | England et al. | |
| 2008/0172562 A1* | 7/2008 | Cachin | G06F 21/6218 |
| | | | 711/E12.098 |
| 2010/0153732 A1 | 6/2010 | Su | |
| 2015/0326567 A1* | 11/2015 | Hamburg | G06F 21/72 |
| | | | 713/155 |

OTHER PUBLICATIONS

Maheshwari et al., "How to build a trusted database system on untrusted storage," OSDI'00 Proceedings of the 4th Conference on Symposium on Operating System Design & Implementation, Oct. 2020, 16 pages, vol. 4, Article No. 10.

* cited by examiner

AUTHENTICATING A FILE SYSTEM WITHIN UNTRUSTED STORAGE

This application is a national stage application under 35 U.S.C. § 371 of International Application No. PCT/US2021/059104, filed Nov. 12, 2021, which claims priority to U.S. Provisional Patent Application No. 63/127,765, filed Dec. 18, 2020, the disclosures of which are explicitly incorporated by reference herein in their entirety.

BACKGROUND

An electronic device can provide a variety of features for a user. For example, the electronic device can provide entertainment (e.g., music, digital books, or movies), access to the Internet, or wireless communication with other electronic devices. As the variety of features and applications supported by the electronic device grows, so does the memory storage requirements. In some situations, it may be impractical to incorporate a target amount of memory storage within the electronic device given a size constraint of the electronic device.

SUMMARY

This document includes techniques, apparatuses, and systems for authenticating a file system within untrusted storage. In particular, a file-system authenticator generates a file-system root hash corresponding to the file system during a write operation. The file-system root hash is uniquely determined based on contents of files within the file system and a structure (e.g., directory structure or file hierarchy) of the file system. To protect the integrity of the file-system root hash, the file-system authenticator stores the file-system root hash within trusted storage. During a read operation, the file-system authenticator uses the file-system root hash to authenticate the file system within the untrusted storage prior to reading data from the file system.

The file-system root hash can be readily updated, which enables the file-system to support a dynamically-changing file system (e.g., support both reading of and writing to the file system). Also, the size of the file-system root hash is independent of the size of the file system within the untrusted storage. As such, the size of the trusted storage can be predetermined and fixed regardless of the size of the file system.

Aspects described below include a method for authenticating a file system within untrusted storage. The method includes accepting write data comprising at least a portion of a file system. The portion of the file system has a structure and at least one file. The method also includes generating a file-system root hash based on the structure of the file system and content of the at least one file. The method additionally includes storing the file-system root hash within trusted storage. The method further includes writing the write data to untrusted storage. The untrusted storage comprising the file system. The method may be a computer-implemented method.

Aspects described below include at least one computer-readable storage medium comprising computer-executable instructions that, responsive to execution by a processor, implement a file-system authenticator configured to perform any of the described methods.

Aspects described below include a system comprising trusted storage, untrusted storage, and a file-system authenticator configured to perform any of the described methods.

Aspects described below also include a system with means for authenticating a file system within untrusted storage.

BRIEF DESCRIPTION OF DRAWINGS

The details of one or more aspects of authenticating a file system within untrusted storage are described in this document with reference to the following drawings. The same numbers are used throughout the drawings to reference like features and components:

FIG. 3-1 illustrates an example file-system authenticator for authenticating a file system within untrusted storage;

FIG. 3-2 illustrates an example structure of a file-system;

FIG. 6-1 illustrates an example system-level authenticator for authenticating a file system within untrusted storage;

FIG. 6-2 illustrates an example file-system summary file;

DETAILED DESCRIPTION

Overview

Figure 1:
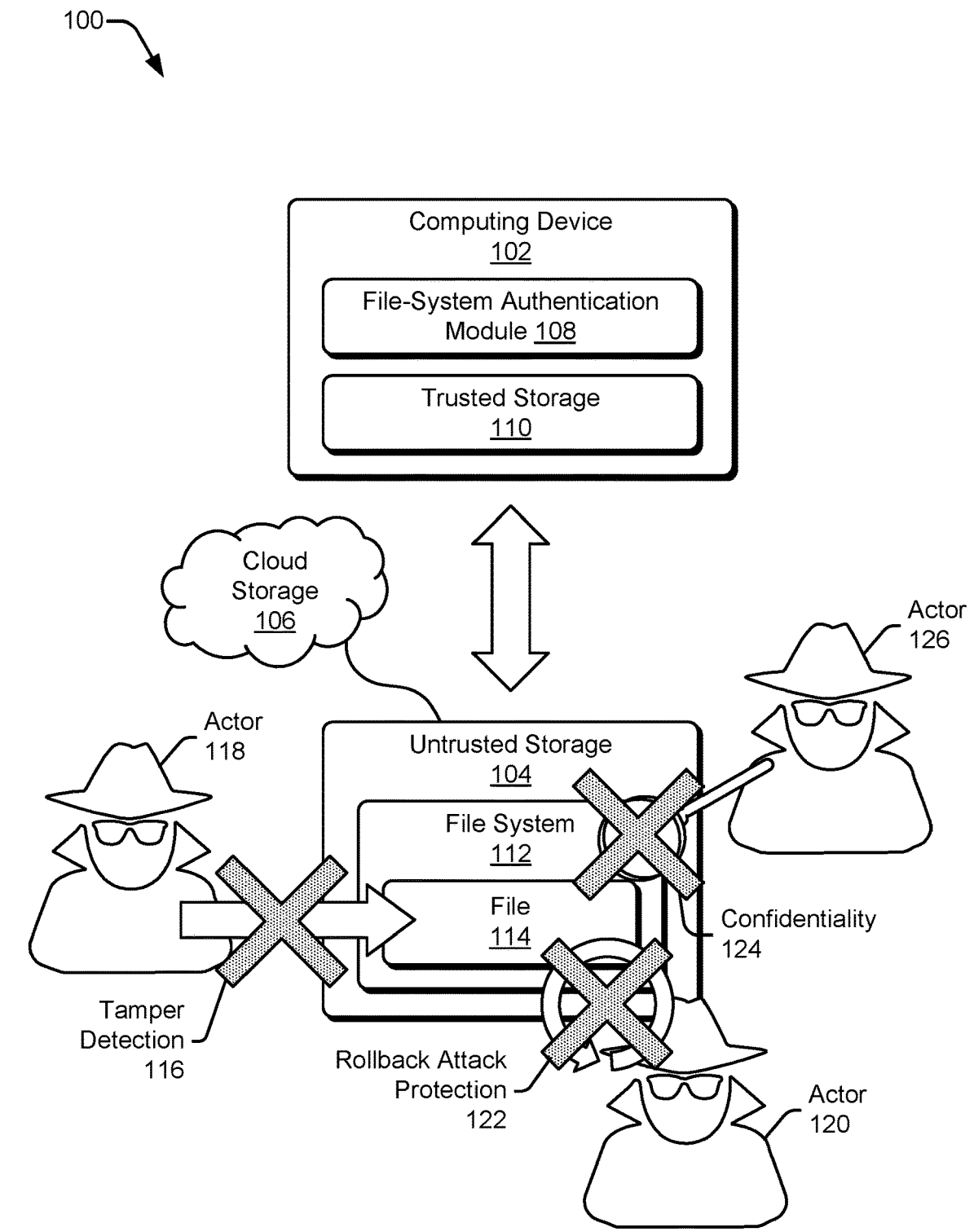
FIG. 1 illustrates an example environment in which a computing device stores a file system within untrusted storage.

An electronic device can provide a variety of features for a user. For example, the electronic device can provide entertainment (e.g., music, digital books, or movies), access to the Internet, or wireless communication with other electronic devices. As the variety of features and applications supported by the electronic device grows, so does the memory storage requirements. In some situations, it may be impractical to incorporate a target amount of memory storage within the electronic device given a size constraint of the electronic device.

To address this issue, some electronic devices access and utilize remote memory storage. In some cases, this remote memory storage can correspond to untrusted storage, which can be vulnerable to attacks from third-party actors. Without appropriate security measures, for example, the third-party actor can read data within the untrusted storage, modify the data, and/or perform a rollback attack to exploit a vulnerability associated with a previous version of the data. Due to the remote nature of the untrusted storage, it can be challenging to provide integrity, confidentiality, and protection from rollbacks for individual files within a file system while enabling both read and write capabilities.

Some techniques provide read-only authentication for an entire disk or an individual file. These techniques, however, do not inherently provide integrity for a dynamically-changing file system (e.g., a write-enabled file system). Also, these techniques may not be able to detect attacks that are directed towards tampering a structure (e.g., a directory structure or file hierarchy) of the file system.

The problem of authenticating a file system within untrusted storage is further complicated by any memory constraints within the electronic device itself. Some authentication techniques may require additional memory resources in order to authenticate larger amounts of data within the untrusted storage. As a result, these techniques may not be practically scalable for authenticating file systems within the untrusted storage using electronic devices with limited internal memory storage.

To address such challenges, techniques for authenticating a file system within untrusted storage are described herein. In particular, a file-system authenticator generates a file-system root hash corresponding to the file system during a write operation. The file-system root hash is uniquely determined based on contents of files within the file system and a structure (e.g., directory structure or file hierarchy) of the file system. To protect the integrity of the file-system root hash, the file-system authenticator stores the file-system root hash within trusted storage. During a read operation, the file-system authenticator uses the file-system root hash to authenticate the file system within the untrusted storage prior to reading data from the file system.

The file-system root hash can be readily updated, which enables the file-system to support a dynamically-changing file system (e.g., support both reading of and writing to the file system). Also, the size of the file-system root hash is independent of the size of the file system within the untrusted storage. As such, the size of the trusted storage can be predetermined and fixed regardless of the size of the file system.

Operating Environment

FIG. 1 illustrates an example environment 100 in which a computing device 102 stores data within untrusted storage 104. In the example environment 100, the untrusted storage 104 is shown to be external (e.g., remote, unmanaged by a virtual machine) from the computing device 102. In other implementations, the untrusted storage 104 can be integrated within the computing device 102. Examples of untrusted storage 104 include a removable storage drive (e.g., a disk or a thumb drive) or network-accessible storage (e.g., cloud storage 106 or a storage server). In some cases, the untrusted storage 104 can also be accessed by other computing devices (not shown).

The computing device 102 includes a file-system authenticator 108 and trusted storage 110. The trusted storage 110 has built-in security features that protect against unauthorized access and modification. As an example, the trusted storage 110 can be implemented using a replay-protected memory block (RPMB), which can protect against a replay attack. In some implementations, the trusted storage 110 has limited memory storage (e.g., a limited size). As an example, a size of the trusted storage 110 can be on the order of a few bytes (e.g., less than 100 byes, less than 50 bytes, or approximately equal to 32 bytes). Together, the file-system authenticator 108 and the trusted storage 110 enable the computing device 102 to authenticate a file system 112 stored within the untrusted storage 104.

The file system 112 includes at least one file 114. The file system 112 can include a collection of files 114 that may or may not be related. Some of the files 114 can be redundant. In this way, the file system 112 differs from a database, which stores related structured data and may not include user-readable file paths. The file 114 can be of any type and is generally organized as a dimensional array of bits or bytes. Example files 114 include image files, executable files, text files, or files associated with an Android application package (APK).

Using the described techniques, the computing device 102 can employ tamper detection 116 to assess the integrity of the file system 112. Consider an example situation in which an actor 118 (e.g., an unauthorized device or user, a third party, an attacker, or an adversary) attempts to modify the file system 112. The actor 118, for example, may try to change data within the file 114, add a new file, delete the file 114, or change a location of the file 114 within a structure of the file system 112. If the actor 118's attack is successful, the computing device 102 is able to detect this tampering and determine that a portion of the file system 112 is compromised. In some cases, the computing device 102 can identify the file 114 or a portion of the file system 112's structure that is affected by the actor 118's attack.

In another example situation, an actor 120 attempts to perform a rollback attack on the file system 112 within the untrusted storage 104. If the attack is successful, the actor 120 may replace the file 114 with a previous version. In some cases, this file 114 has a vulnerability that the actor 120 can exploit. Using the described techniques, the computing device 102 can provide rollback attack protection 122 by detecting the rollback attack. Optionally, the described techniques can provide confidentiality 124 and prevent an actor 126 from reading the contents of the file system 112.

By providing tamper detection 116, rollback attack protection 122, and/or confidentiality 124, the computing device 102 can utilize the untrusted storage 104 to meet a target amount of memory storage for supporting a particular set of features and/or applications. Additionally, a memory-constrained computing device may no longer be constrained by the limited amount of available internal memory storage. The file-system authenticator 108 and the trusted storage 110 are further described with respect to FIG. 2.

Figure 2:
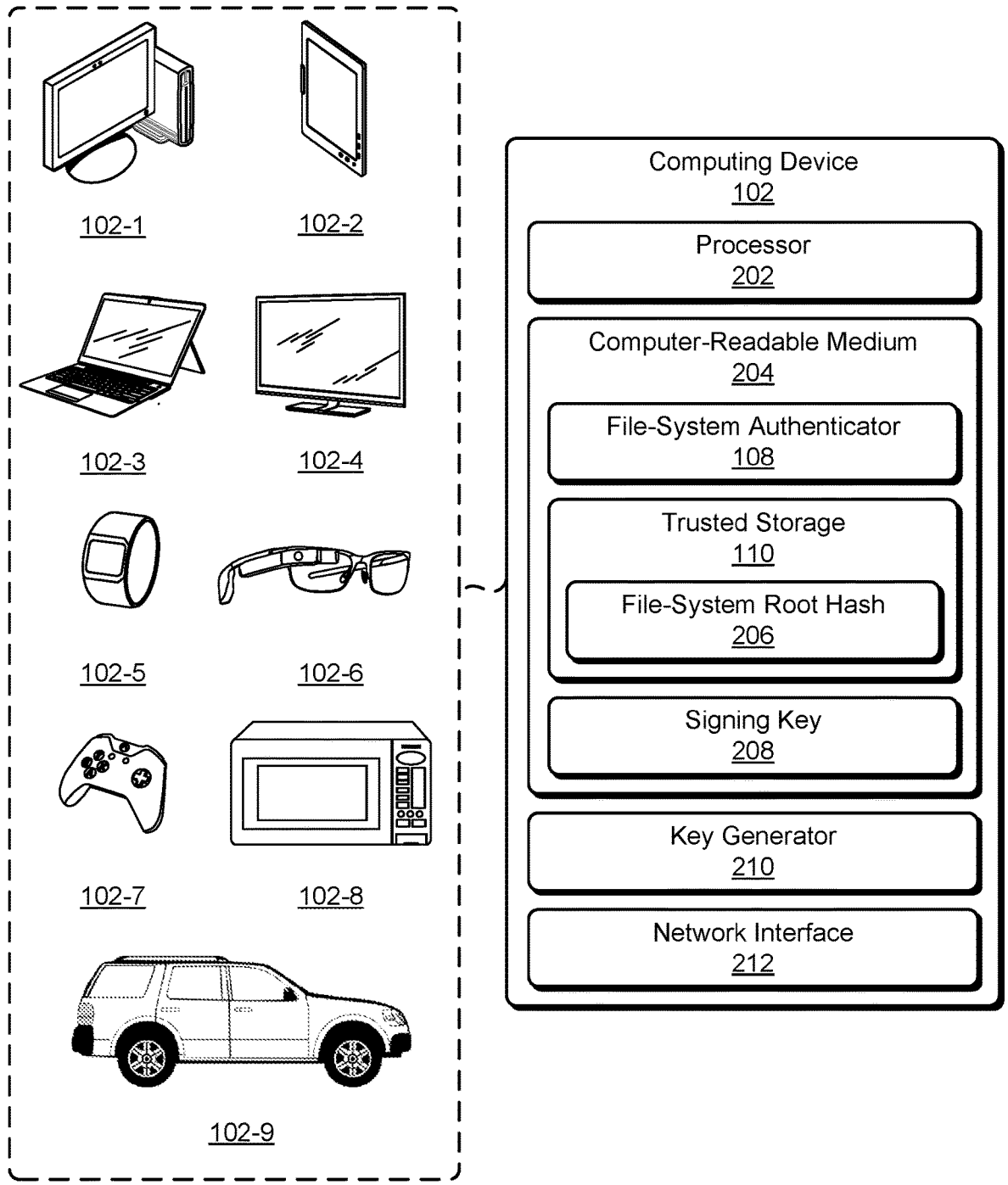
FIG. 2 illustrates an example computing device capable of authenticating a file system within untrusted storage.

FIG. 2 illustrates an example computing device 102 for authenticating the file system 112 within the untrusted storage 104. The computing device 102 is illustrated with various non-limiting example devices including a desktop computer 102-1, a tablet 102-2, a laptop 102-3, a television 102-4, a computing watch 102-5, computing glasses 102-6, a gaming system 102-7, a microwave 102-8, and a vehicle 102-9. Other devices may also be used, including a server, a home-service device, a smart speaker, a smart thermostat, a security camera, a baby monitor, a WiFi® router, a drone, a trackpad, a drawing pad, a netbook, an e-reader, a home-automation and control system, a wall display, a virtual-reality headset, and another home appliance. Note that the computing device 102 can be wearable, non-wearable but mobile, or relatively immobile (e.g., desktops and appliances).

The computing device 102 includes at least one processor 202 and at least one computer-readable medium 204, which can include memory media and/or storage media. Applications and/or an operating system (not shown) embodied as computer-readable instructions on the computer-readable medium 204 can be executed by the processor 202 to provide some of the functionalities described herein. The computer-readable medium 204 is non-transitory and can be implemented using any type of computer-readable medium (e.g., random-access memory (RAM), static RAM (SRAM), dynamic RAM (DRAM), non-volatile RAM (NVRAM), read-only memory (ROM), or Flash memory).

Although not explicitly illustrated in FIG. 2, the computer-readable medium 204 can store data associated with an operating system, one or more applications, user data, and/or multimedia data. The data can include instructions in computer-readable form. The instructions can be executed using including field-programmable gate arrays (FPGA), machine code, assembly code, higher-order code (e.g., RUBY), or any combination thereof. The computer-readable medium 204 includes the file-system authenticator 108, which is further described with respect to FIG. 3-1.

The computer-readable medium 204 also includes the trusted storage 110. The trusted storage 110 stores a file-system root hash 206 (e.g., a global root hash), which is provided by the file-system authenticator 108. The file-system root hash 206 is uniquely determined based on the content of files 114 within the file system 112 and the organization (e.g., hierarchy) of the files 114 within the file system 112 (e.g., a directory structure of the file system 112). The file-system root hash 206 enables the computing device 102 to perform tamper detection 116 shown in FIG. 1 and verify the integrity of the file system 112. Using the file-system root hash 206, the computing device 102 can perform authentication of the file system 112 by comparing a computed root hash of the file system 112 with the previously-stored file-system root hash.

In some implementations, the file-system root hash 206 can also be based on a version number associated with the file system 112 or respective versions of the files 114 within the file system 112. Alternatively, the trusted storage 110 can directly store a version number associated with the file system 112. By incorporating the version number within the file-system root hash 206 or directly storing the version number within the trusted storage 110, the computing device 102 can provide the rollback attack protection 122 shown in FIG. 1.

In some implementations, a size of the trusted storage 110 is predetermined based on a size of the file-system root hash 206. In general, the size of the file-system root hash 206 is fixed (e.g., unchanged) and can be relatively small compared to a size of the file system 112. The size of the file-system root hash 206 is based on a hash function employed by the file-system authenticator 108 to generate the file-system root hash 206.

The computer-readable medium 204 can optionally include a signing key 208 to provide the confidentiality 124 shown in FIG. 1. The signing key 208 is a cryptographic key used to sign (e.g., encrypt) data that is transferred to the untrusted storage 104. The signing key 208 can also be used to decrypt data that is retrieved from the untrusted storage 104. In some examples, the signing key 208 is a private key stored in the trusted storage 110 and enables authenticity verification through an associated public key. In another example, the signing key 208 corresponds to a public key, and the associated private key is stored offboard the computing device 102 (e.g., in cloud storage 106, or on a removable device). In this example, the computing device 102 verifies the file system 112 using the public signing key. In some implementations, the computing device 102 uses the signing key 208 to sign the file-system root hash 206. The computing device 102 can optionally include a key generator 210, which generates the signing key 208. The key generator 210 can be implemented by a trusted execution environment within a system-on-chip (SoC) (e.g., a security chip).

The computing device 102 can also include a network interface 212 for communicating data over wired, wireless, or optical networks. For example, the network interface 214 may communicate data over a local-area-network (LAN), a wireless local-area-network (WLAN), a personal-area-network (PAN), a wire-area-network (WAN), an intranet, the Internet, a peer-to-peer network, point-to-point network, a mesh network, and the like. Using the network interface 214, the computing device 102 can read or write to the untrusted storage 104. The computing device 102 may also include a display (not shown). Although not shown, some implementations of the computer-readable medium 204 include the untrusted storage 104. The file-system authenticator is further described with respect to FIG. 3-1.

Figures 1, 3:
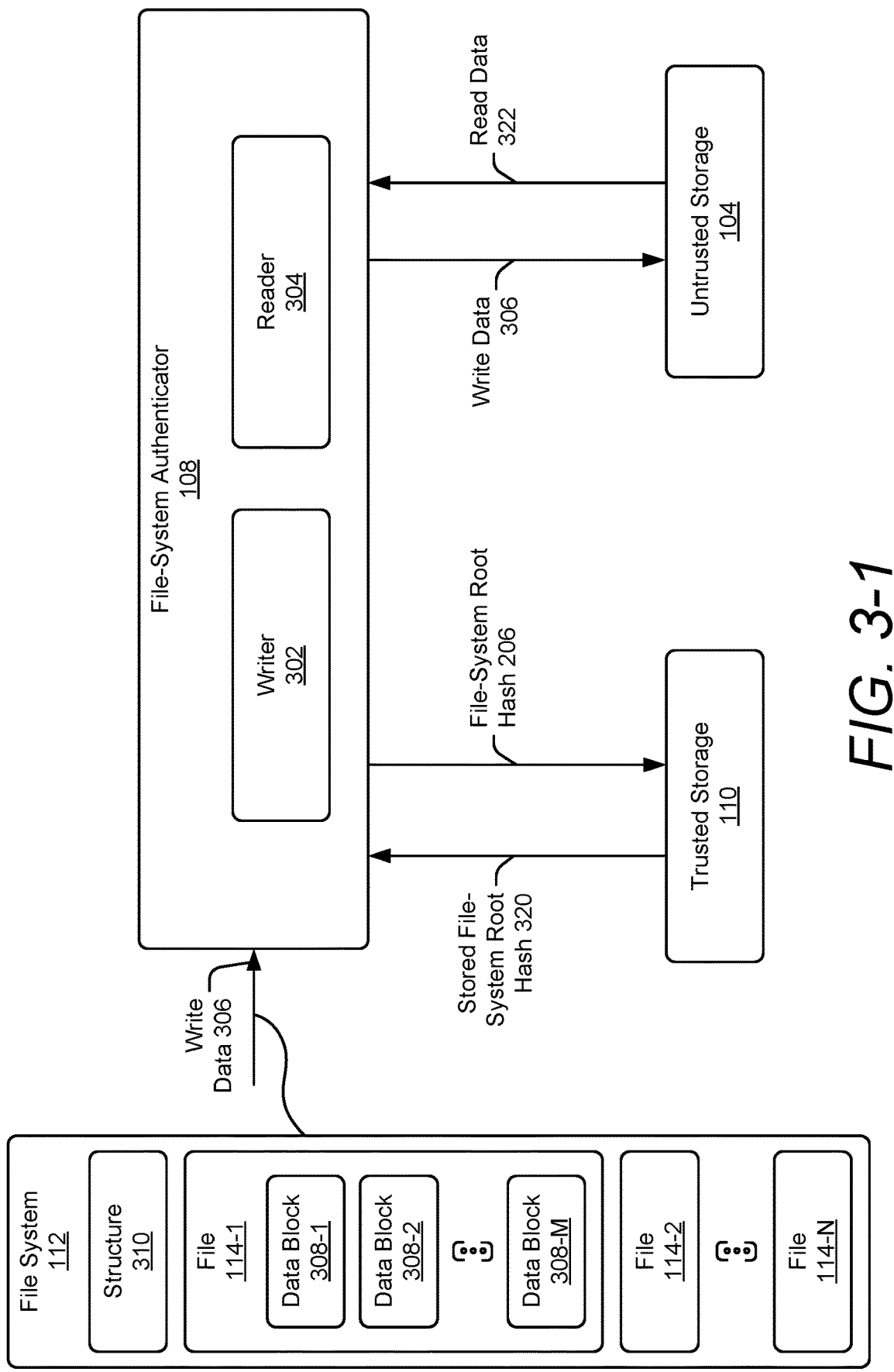
Figures 2, 3:
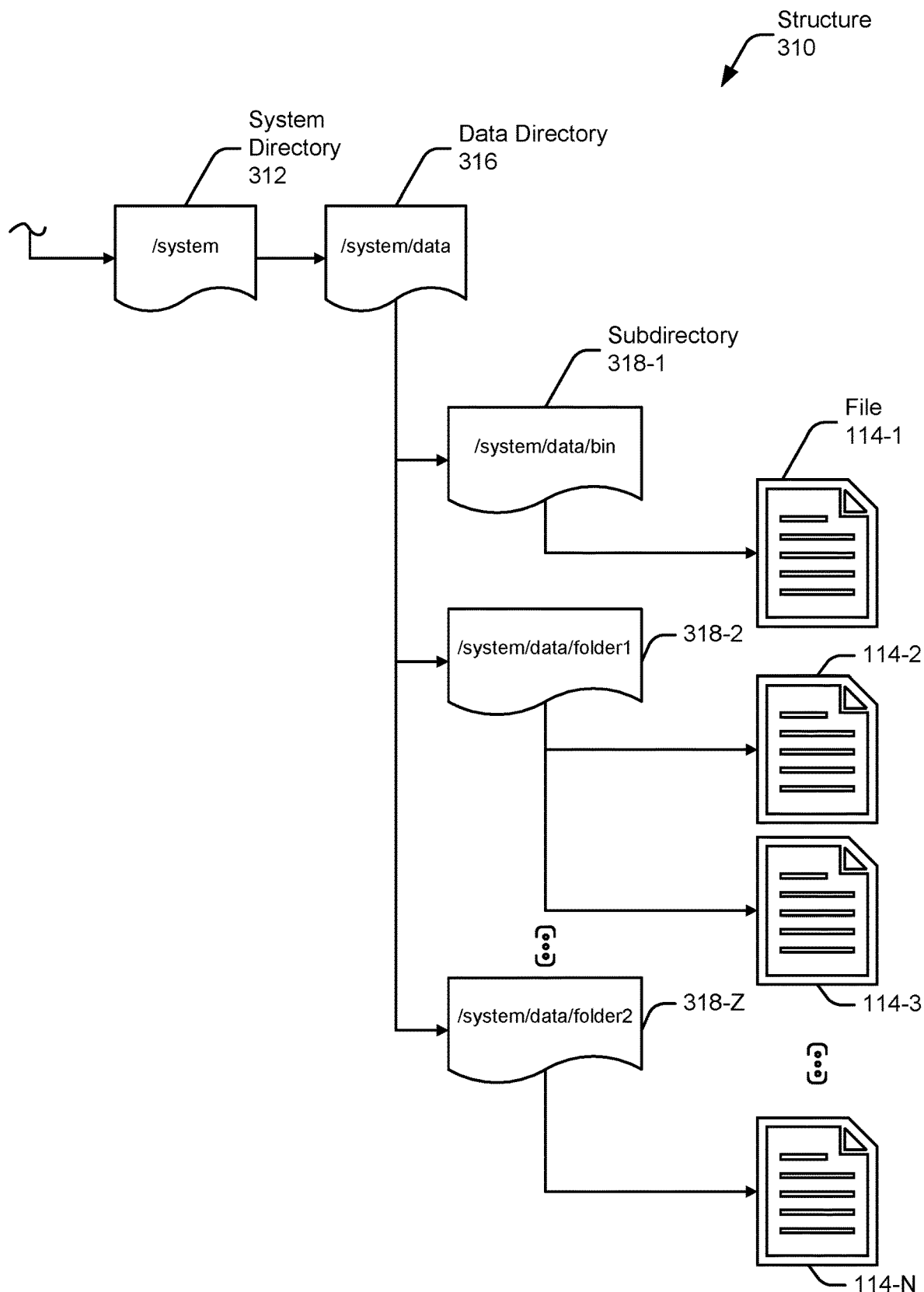

FIG. 3-1 illustrates an example file-system authenticator 108 for authenticating the file system 112 within the untrusted storage 104. The file-system authenticator 108 is operably coupled to the trusted storage 110 and the untrusted storage 104 (of FIG. 1). In the depicted configuration, the file-system authenticator 108 includes a writer 302 and a reader 304. The writer 302 writes data to the untrusted storage 104, and the reader 304 reads data from the untrusted storage 104. In particular, the writer 302 writes at least a portion of the file system 112 to the untrusted storage 104. For example, the writer 302 can write the entire file system 112 to the untrusted storage 104 or write a portion of the file system 112 associated with a change (e.g., write one or more files 114 and/or directory paths specified by a user of the computing device 102). Likewise, the reader 304 can read the entire file system 112 within the untrusted storage 104 or read a portion of the file system 112 specified by the user. In some implementations, the writer 302 and the reader 304 use the network interface 212 (of FIG. 2) to communicate with the untrusted storage 104 and/or the trusted storage 110.

During a write operation, the file-system authenticator 108 accepts write data 306. In various implementations, the computer-readable medium 204, the trusted storage 110, or another external computer-readable medium (not shown) can provide the write data 306 to the file-system authenticator 108. The write data 306 includes at least a portion of the file system 112. The file system 112 includes files 114-1, 114-2 . . . 114-N, where N represents a positive integer. Each file 114 has a corresponding file identifier, which can include a file name and/or a file path. Additionally, the file 114 can include one or more data blocks, such as data blocks 308-1, 308-2 . . . 308-M, where M represents a positive integer that may or may not be equal to N.

The file system 112 also includes a structure 310, which includes information about a directory structure and locations of the files 114-1 to 114-N within this directory structure. The directory structure can include one or more folders. Each folder can include any quantity of files 114 (e.g., zero files, one file, or multiple files). An example structure 310 of the file system 112 is further described with respect to FIG. 3-2.

FIG. 3-2 illustrates an example structure 310 of the file system 112. The file-system structure 400 may be of any type. As shown, the file-system structure 400 is hierarchical. The structure 310 includes a system directory 312. The system directory 312 includes a data directory 316. The data directory 316 can include various subdirectories 318-1, 318-2 . . . 318-Z, where Z represents a positive integer. The subdirectories 318-1 to 318-Z organize the files 114-1 to 114-N.

Returning to FIG. 3-1, the file-system authenticator 108 uses the writer 302 to generate the file-system root hash 206 and write the write data 306 to the untrusted storage 104. The writer 302 is further described with respect to FIG. 4.

During a read operation, the file-system authenticator 108 accepts the stored file-system root hash 320 from the trusted storage 110. Using the stored file-system root hash 320, the reader 304 authenticates the file system 112 that is stored within the untrusted storage 104. If the authentication is successful, the reader 304 extracts and processes read data 322 from the untrusted storage 104. The reader 304 is further described with respect to FIG. 8.

Although not shown, the file-system authenticator 108 can also accept the signing key 208 to support encryption and decryption during the write and read operations, respectively.

Figure 4:
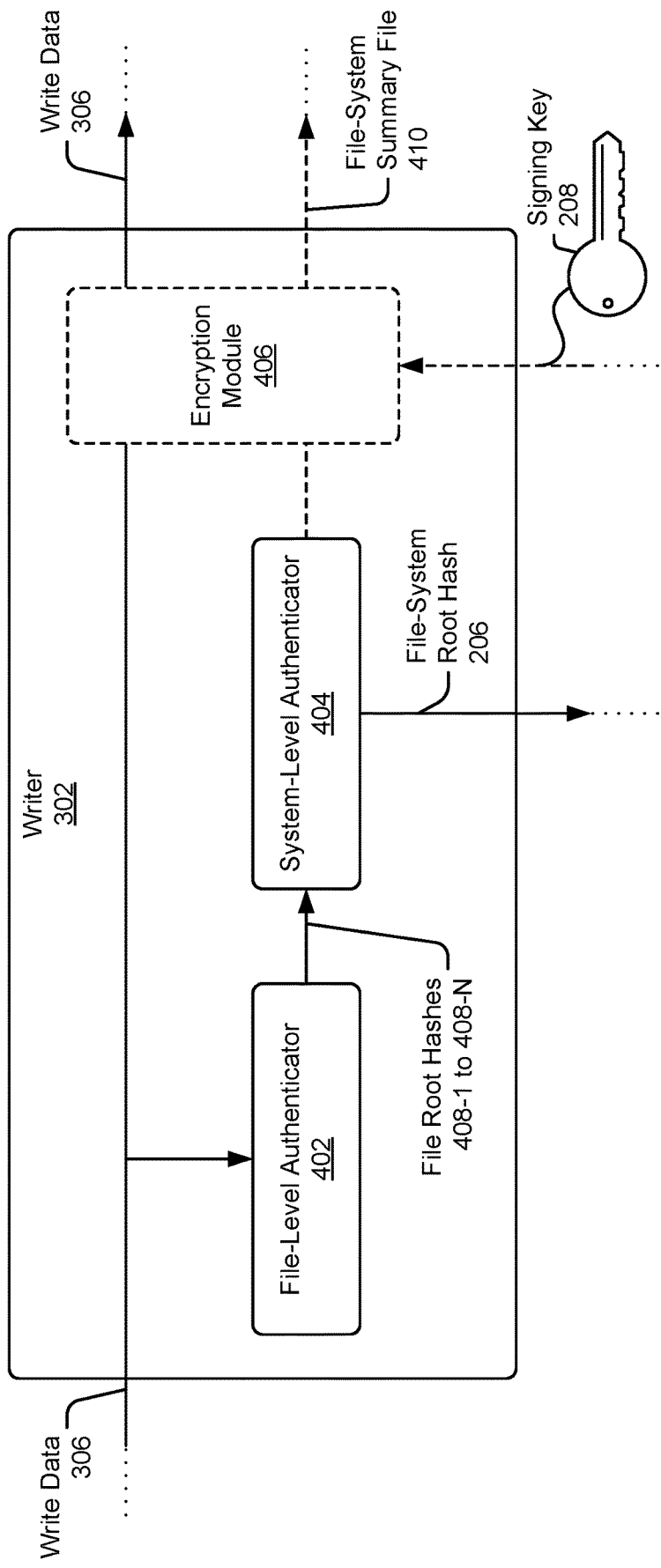
FIG. 4 illustrates an example writer for authenticating a file system within untrusted storage.

FIG. 4 illustrates an example writer 302 for authenticating the file system 112 within the untrusted storage 104. In the depicted configuration, the writer 302 includes a file-level authenticator 402 and a system-level authenticator 404. The file-level authenticator 402 operates on individual files 114-1 to 114-N within the write data 306 to enable authentication of the individual files 114-1 to 114-N. The file-level authenticator 402 is further described with respect to FIG. 5. The system-level authenticator 404 operates on the structure 310 of the file system 112 to enable authentication of the structure 310. The system-level authenticator 404 is further described with respect to FIG. 6-1.

The writer 302 can also optionally include an encryption module 406. The encryption module 406 encrypts the write data 306 using the signing key 208. In this way, the encryption module 406 can provide the confidentiality 124 shown in FIG. 1. The system-level authenticator 404 is operably coupled to the trusted storage 110 (of FIG. 3-1). The system-level authenticator 404 can also be optionally coupled to the untrusted storage 104 (of FIG. 3-1).

During operation, the file-level authenticator 402 accepts the write data 306. The file-level authenticator 402 generates file root hashes 408-1 to 408-N for the respective files 114-1 to 114-N. The system-level authenticator 404 uses the file root hashes 408-1 to 408-N to generate the file-system root hash 206. In some implementations, the system-level authenticator 404 generates a file-system summary file 410, which can summarize the structure 310 and the content of the files 114-1 to 114-N. Example file-system summary files 410 can include a text file or a JavaScript Object Notation (JSON) file.

In some implementations, the encryption module 406 uses the signing key 208 to encrypt the write data 306 and/or the file-system summary file 410. The writer 302 writes the write data 306 and optionally writes the file-system summary file 410 to the untrusted storage 104. The file-level authenticator is further described with respect to FIG. 5.

Figure 5:
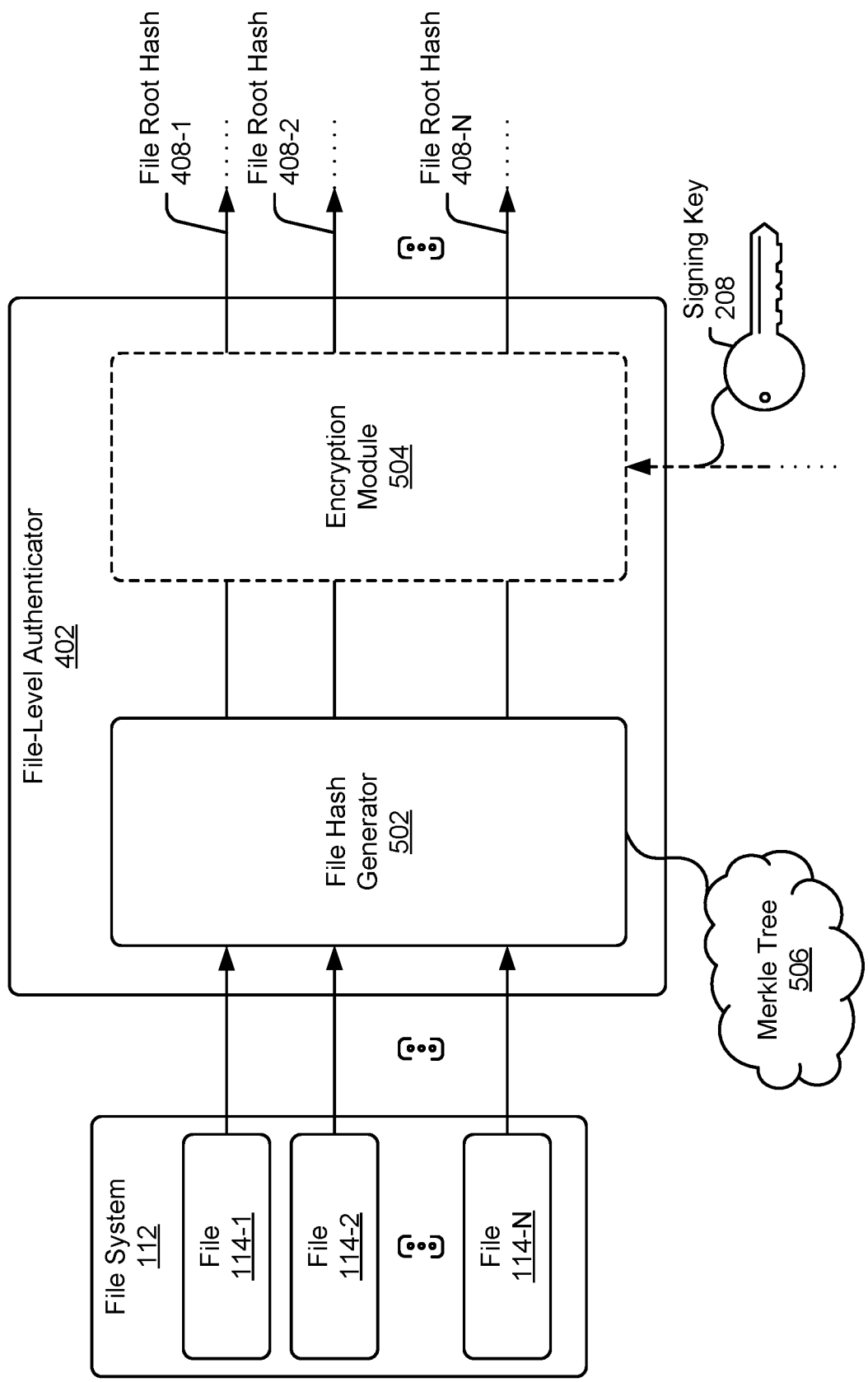
FIG. 5 illustrates an example file-level authenticator for authenticating a file system within untrusted storage.

FIG. 5 illustrates an example file-level authenticator 402 for authenticating the file system 112 within the untrusted storage 104. In the depicted configuration, the file-level authenticator 402 includes a file hash generator 502 and optionally includes an encryption module 504. The file hash generator 502 executes a hash function, which is a one-way function that maps data of any size to a hash (or digest) associated with a fixed size. The encryption module 504 performs encryption using the signing key 208. The encryption module 504 can use a similar or different encryption algorithm as the encryption module 406 of FIG. 4.

During operation, the file hash generator 502 accepts the write data 306 and generates file root hashes 408-1 to 408-N for the respective files 114-1 to 114-N. In some examples, the file hash generator 502 generates each file root hash 408-1 to 408-N using a hash tree, such as a Merkle tree 506. For example, to generate the file root hash 408-1 corresponding to the file 114-1 (of FIG. 3-1), the file hash generator 502 generates hashes (e.g., digests) of the data blocks 308-1 to 308-M (of FIG. 3-1). The file hash generator 502 assigns these hashes as the leaf hashes of the Merkle tree 506. Using these leaf hashes, the file hash generator 502 computes the file root hash 408-1. The file-level authenticator 402 provides the file root hashes 408-1 to 408-N to the system-level authenticator 404, which is further described with respect to FIG. 6-1. Optionally, the encryption module 604 can encrypt the file root hashes 408-1 to 408-N.

Figures 1, 6:
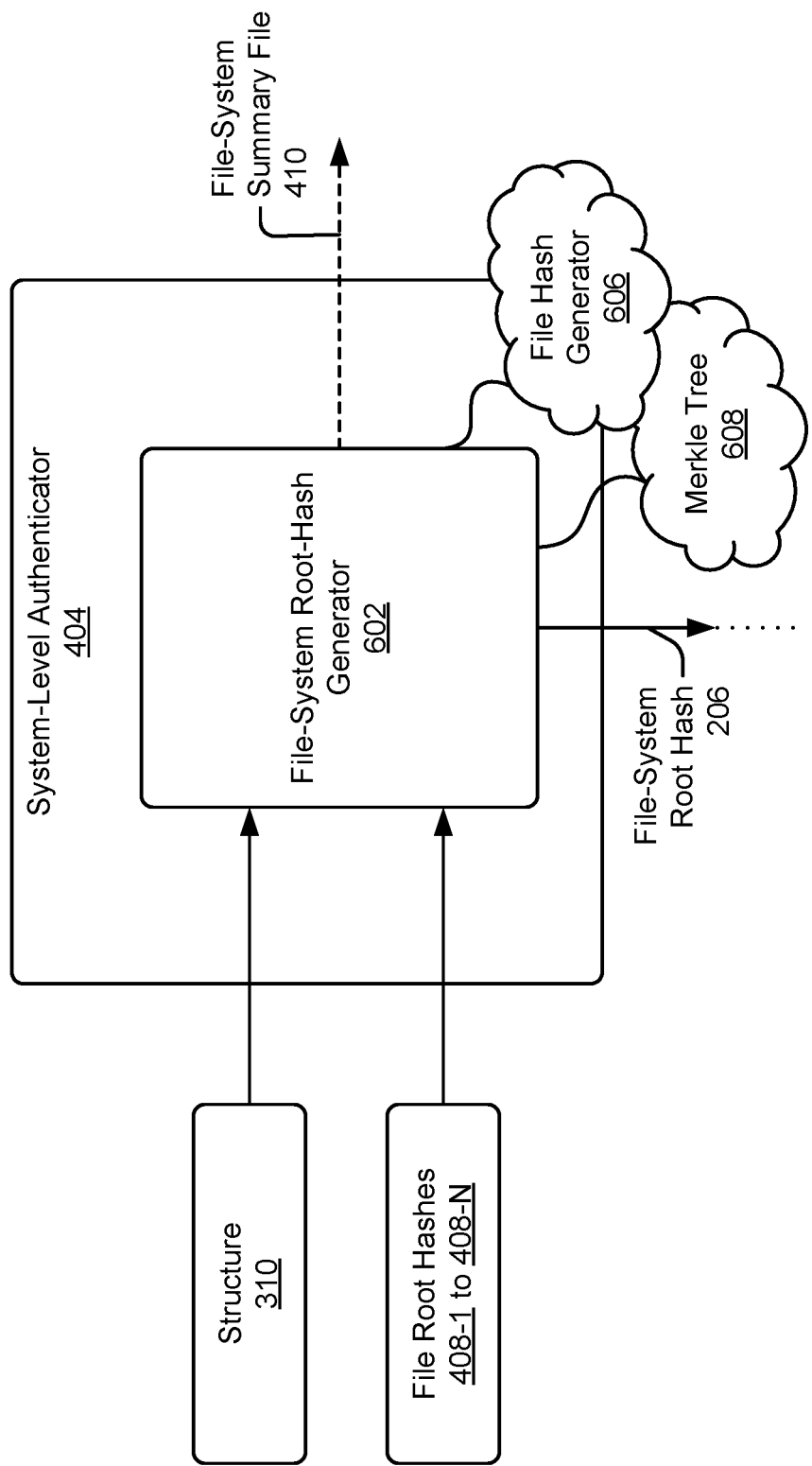
Figures 2, 6:
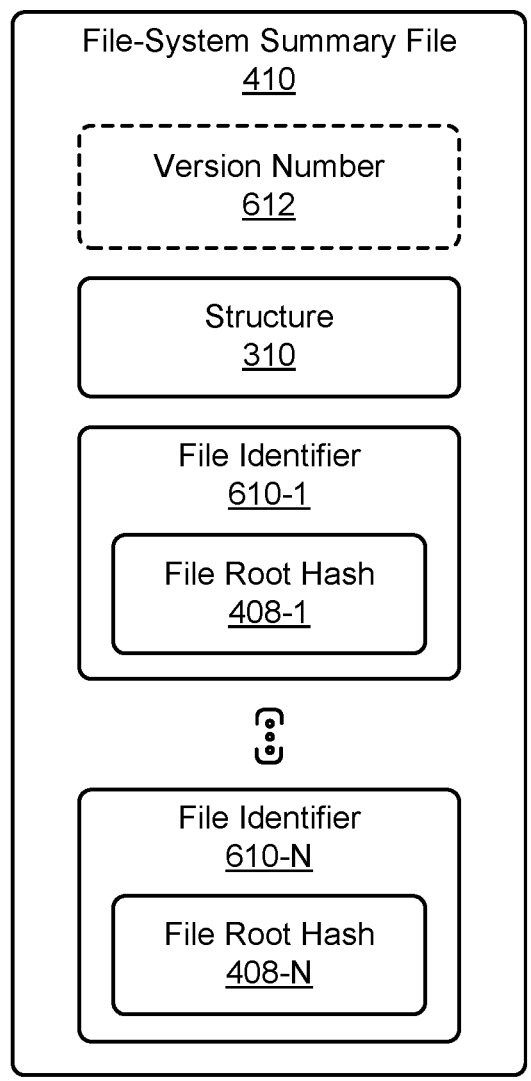

FIG. 6-1 illustrates an example system-level authenticator 404 for authenticating the file system 112 within the untrusted storage 104. In the depicted configuration, the system-level authenticator 404 includes a file-system root-hash generator 602. The file-system root-hash generator 602 generates the file-system root hash 206 using a file hash generator 606, a Merkle tree 608, or some combination thereof.

During operation, the file-system root-hash generator 602 accepts the structure 310 and the file root hashes 408-1 to 408-N. In an example implementation, the file-system root-hash generator 602 generates the file-system summary file 410 and uses the file hash generator 606 to generate the file-system root hash 206 based on the file-system summary file 410. In particular, the file-system root-hash generator 602 generates the file-system summary file 410 based on the structure 310 and the file root hashes 408-1 to 408-N. An example file-system summary file 410 is further described with respect to FIG. 6-2.

FIG. 6-2 illustrates an example file-system summary file 410. The file-system summary file 410 includes information about the structure 310 and the file root hashes 408-1 to 408-N. Within the file-system summary file 410, the file root hashes 408-1 to 408-N are respectively associated with file identifiers 610-1 to 610-N. The file identifiers 610-1 to 610-N can specify the file names, paths, and/or version numbers associated with the corresponding files 114-1 to 114-N. Optionally, the file-system summary file 410 can include a version number 612, which can be used to verify a version associated with the file system 112. Although not shown, the file-system summary file 410 can also include other types of metadata associated with the file system 112.

In some implementations, the file-system summary file 410 can comprise multiple summary files, which correspond to different portions of the file system 112. In other words, the multiple summary files can include a summary file for one or more subdirectories 318-1 to 318-Z (of FIG. 3-2), another summary file for one or more data directories 316 (of FIG. 3-2), an additional summary file for the system directory 312 (of FIG. 3-2), or some combination thereof.

Returning to FIG. 6-1, the file-system root-hash generator 602 uses the file hash generator 606 to generate the file-system root hash 206 based on the file-system summary file 410. In other words, the file hash generator 606 generates a root hash of the file-system summary file 410, which corresponds to the file-system root hash 206. Since the file-system summary file 410 includes information about the structure 310 and the content of the files 114-1 to 114-N (via the file root hashes 408-1 to 408-N), the root hash of the file-system summary file 410 is inherently based on (e.g., derived from or dependent upon) the structure 310 and the content of the files 114-1 to 114-N. As such, the root hash of the file-system summary file 410 can be provided as the file-system root hash 206 and can have a unique value for various file systems 112 with different structures 310, files 114-1 to 114-N, and/or versions 612. The system-level authenticator 404 can write the file-system summary file 410 to the untrusted storage 104.

If the file-system summary file 410 comprises multiple summary files, the computing device 102 uses the multiple summary files to generate the file-system root hash 206. For example, at a leaf level, the computing device 102 computes file root hashes of the summary files within the file system 112. A branch level includes another summary file for the antecedent files (e.g., branch summary files). As an example, the antecedent files may be associated by a folder of the structure 310 (of FIG. 3-2). That is, the summary files on a branch layer include all of the hashes and file paths of the antecedent files. The root level includes another summary file (e.g., a root summary file), which describes the branch summary files. As an example, the root level has respective folder path locations for each of the summary files between the leaves and the root, and the root level also includes hashes for those summary files. As such, the resulting root hash of the multiple summary files is based on both the contents of the files 114-1 to 114-N and the structure 310. Any number of branch summary files and files 114-1 to 114-N are contemplated through this example. The branch summary files may be based on the file folders, or file-folder structure, of the file system 112. Optionally, the root hash can also be based on versions of the files within the file system.

In another implementation, the file-system root-hash generator 602 generates the file-system summary file 410 using the Merkle tree 608. In this case, the file root hashes 408-1 to 408-N correspond to leaves of the Merkle tree 608. The file-system root-hash generator 602 designs the branches of the Merkle tree 608 based on the structure 310 of the file system 112. As an example, the branch structure of the Merkle tree 608 can resemble the structure 310 of the file system 112, as shown in FIG. 3-2. In this way, the resulting root hash of the Merkle tree 608 is based on (e.g., derived from or dependent upon) the structure 310 and the content of the files 114-1 to 114-N. In some cases, the Merkle tree 506 and the Merkle tree 608 can be combined to form a single, multi-level Merkle tree. The Merkle tree is multi-leveled in the since that a lower level (e.g., a first level) operates on data within the files 114-1 to 114-N and an upper level (e.g., a second level) operates on the directory relationship between the files 114-1 to 114-N within the structure 310. Optionally, the Merkle tree 608 can also include information about the version of files within the file system.

Figure 7:
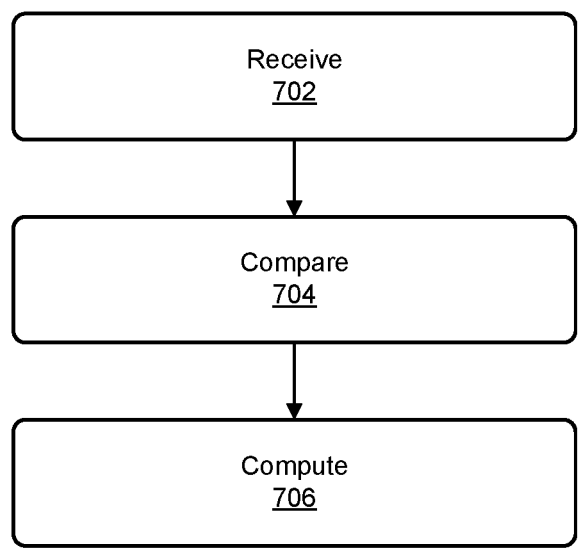
FIG. 7 illustrates an example method for enabling version authentication in file systems within untrusted storage.

With regard to FIG. 7, an implementation of the multi-level scheme (a scheme associated with the multiple summary files) can be realized. As an example, a file revision may be received in block 902. In an example implementation, the revision is provided by a user or another server or computer. The revision may change the structure 310 of the file system 112 or the contents of one of the files 114-1 to 114-N.

In block 704, a comparison is made between the file paths in the branch summary file or root summary file to identify revised file paths (e.g., new files) or revised file root hashes 408 (e.g., revised files 114). If no revisions have been made, the branch summary file or files and root summary file remain unchanged.

In block 906, if a file 114 has been revised, added, or deleted, new file root hashes 408 may be computed and the corresponding branch summary file is revised to incorporate the updated paths and updated file root hashes 408. In an example, only the updated paths and updated file root hashes 408 are revised, leaving the original or previous file paths and root hashes intact. In a similar fashion, branch summary files and the root summary file higher in the hierarchy than the now revised branch summary file are revised according to the revised summary files. In this example, only the branch summary files and root summary file that have information pertaining to the revised files and updated branch summary files are updated.

Figure 8:
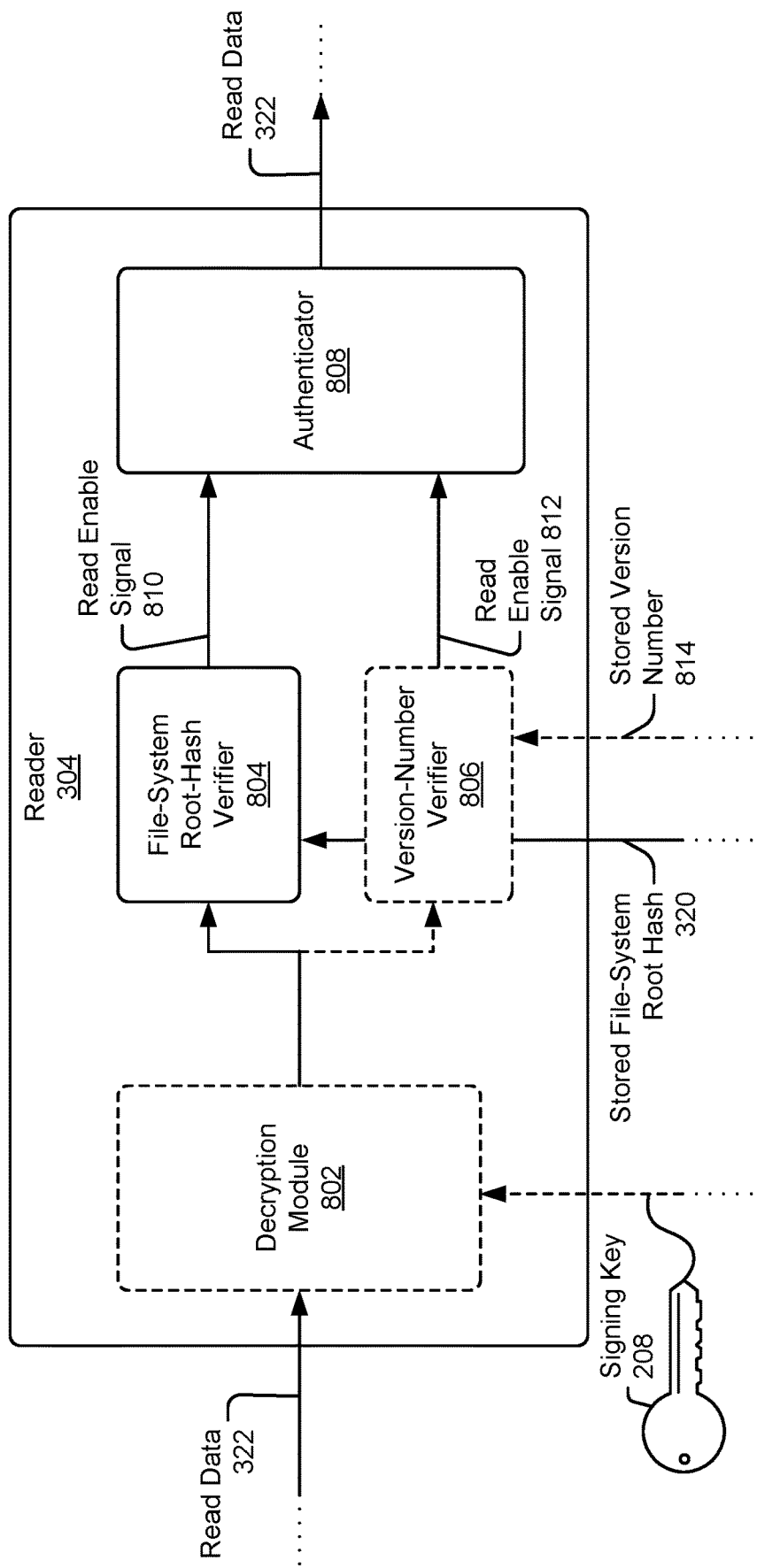
FIG. 8 illustrates an example reader for authenticating a file system within untrusted storage.

FIG. 8 illustrates an example reader 304 for authenticating the file system 112 within the untrusted storage 104. In the depicted configuration, the reader 304 includes an optional decryption module 802, a file-system root-hash verifier 804, an optional version-number verifier 806, and an authenticator 808. The decryption module 802 performs decryption using the signing key 208. The file-system root-hash verifier 804 verifies the file system 112 based on the stored file-system root hash 320 to provide tamper detection 116 and/or rollback attack protection 122 (of FIG. 1). The version-number verifier 806 verifies the version number 612 associated with the file system 112, which provides further rollback attack protection 122. The authenticator 808 determines whether or not to extract and process the read data 322 based on information from the file-system root-hash verifier 1004 and the version-number verifier 806.

During a read operation, the reader 304 accesses the read data 322 within the untrusted storage 104. The read data 322 can include at least a portion of the file system 112. In some implementations, the read data 322 also includes the file-system summary file 410. The decryption module 1002 can decrypt the read data 322 using the signing key 208 in situations in which information within the file system 112 is encrypted (e.g., previously encrypted by the writer 302). The file-system root-hash verifier 804 compares a file-system root-hash associated with the file system 112 to the stored file-system root hash 320. The file system root-hash verifier 804 generates a read enable signal 810, which indicates whether or not the computed file-system root-hash of the file system 112 matches the stored file-system root hash 320.

The version-number verifier 806 compares a version number 612 stored within the file system 112 to a stored version number 814. The version-number verifier 806 generates a read enable signal 812, which indicates whether or not the extracted version number 612 of the file system 112 matches the stored version number 814.

The authenticator 808 accepts the read enable signal 810 and/or the read enable signal 812. Responsive to both the read enable signals 810 and 812 indicate successful verification, the authenticator 808 determines that the file system 112 is authenticated and passes the read data 322 to another component of the computing device 102. Alternatively, if one or both of the read enable signals 810 or 812 indicate an unsuccessful verification, the authenticator 808 avoids processing the read data 322. In some cases, the authenticator 808 can inform the user of the computing device 102 of the unsuccessful verification.

Example Method

Figure 9:
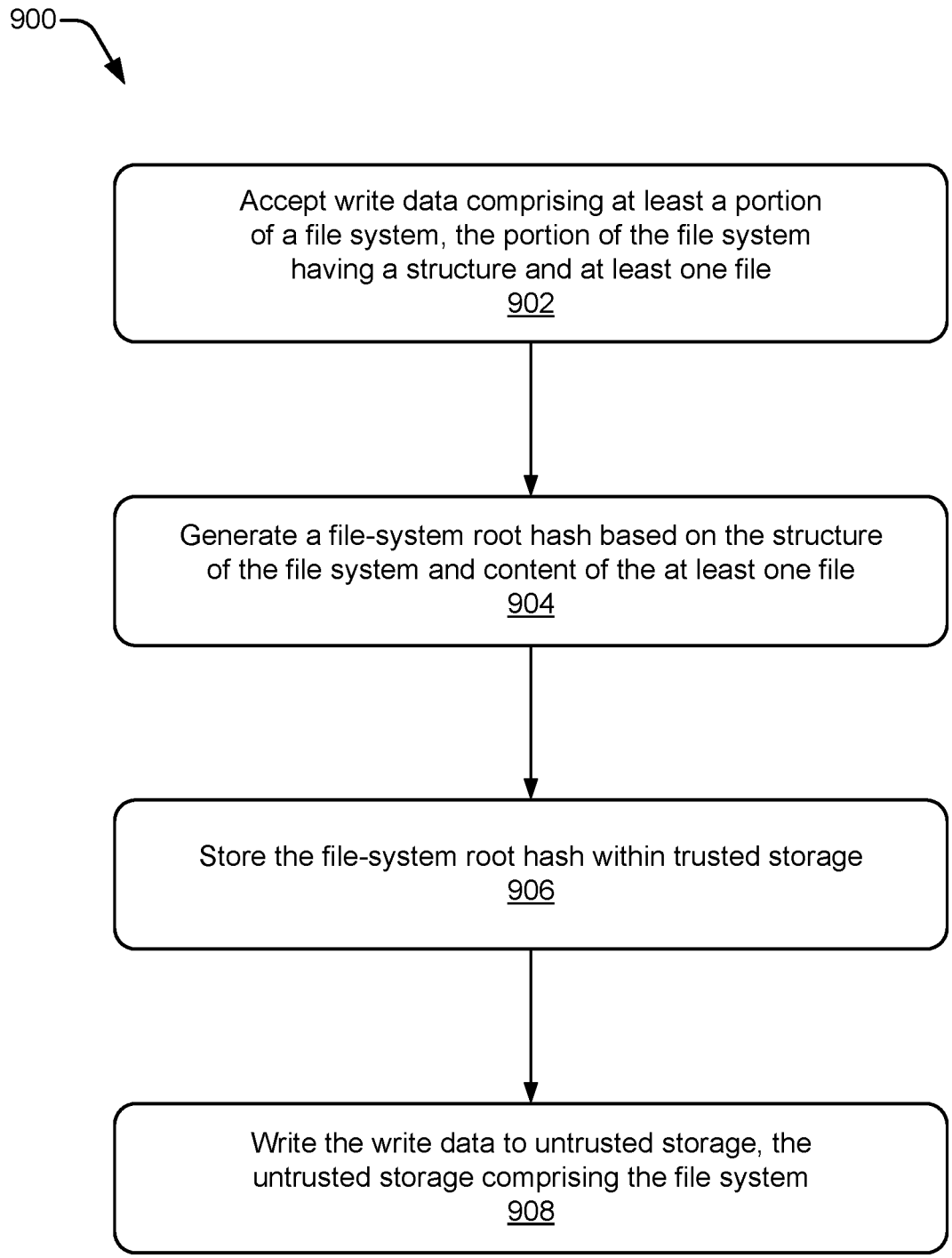
FIG. 9 illustrates an example method for authenticating a file system within untrusted storage.

FIG. 9 depicts an example method 900 for authenticating a file system within untrusted storage. The method may be implemented by a computing device or across a plurality of computing devices. Method 900 is shown as sets of operations (or acts) performed but not necessarily limited to the order or combinations in which the operations are shown herein. Further, any of one or more of the operations may be repeated, combined, reorganized, or linked to provide a wide array of additional and/or alternate methods. In portions of the following discussion, reference may be made to the environment 100 of FIG. 1, and entities detailed in FIG. 2 or 3-1, reference to which is made for example only. The techniques are not limited to performance by one entity or multiple entities operating on one device.

At 902, write data comprising at least a portion of a file system is accepted. The portion of the file system has a structure and at least one file. For example, the file-system authenticator 108 accepts the write data 306, as shown in FIG. 3-1. The write data 306 includes at least a portion of the file system 112, which has the structure 310 and includes at least one file 114.

At 904, a file-system root hash is generated based on the structure of the file system and content of the at least one file. For example, the file-system authenticator 108 generates the file-system root hash 206 based on the structure 310 and the content of the at least one file 114.

At 906, the file-system root hash is stored within trusted storage. For example, the file-system authenticator 108 provides the file-system root hash 206 to the trusted storage 110.

At 908, the write data is written to untrusted storage. The untrusted storage comprises the file system. For example, the file-system authenticator 108 writes the write data 306 to the untrusted storage 104, which includes the file system 112.

Example Computing System

Figure 10:
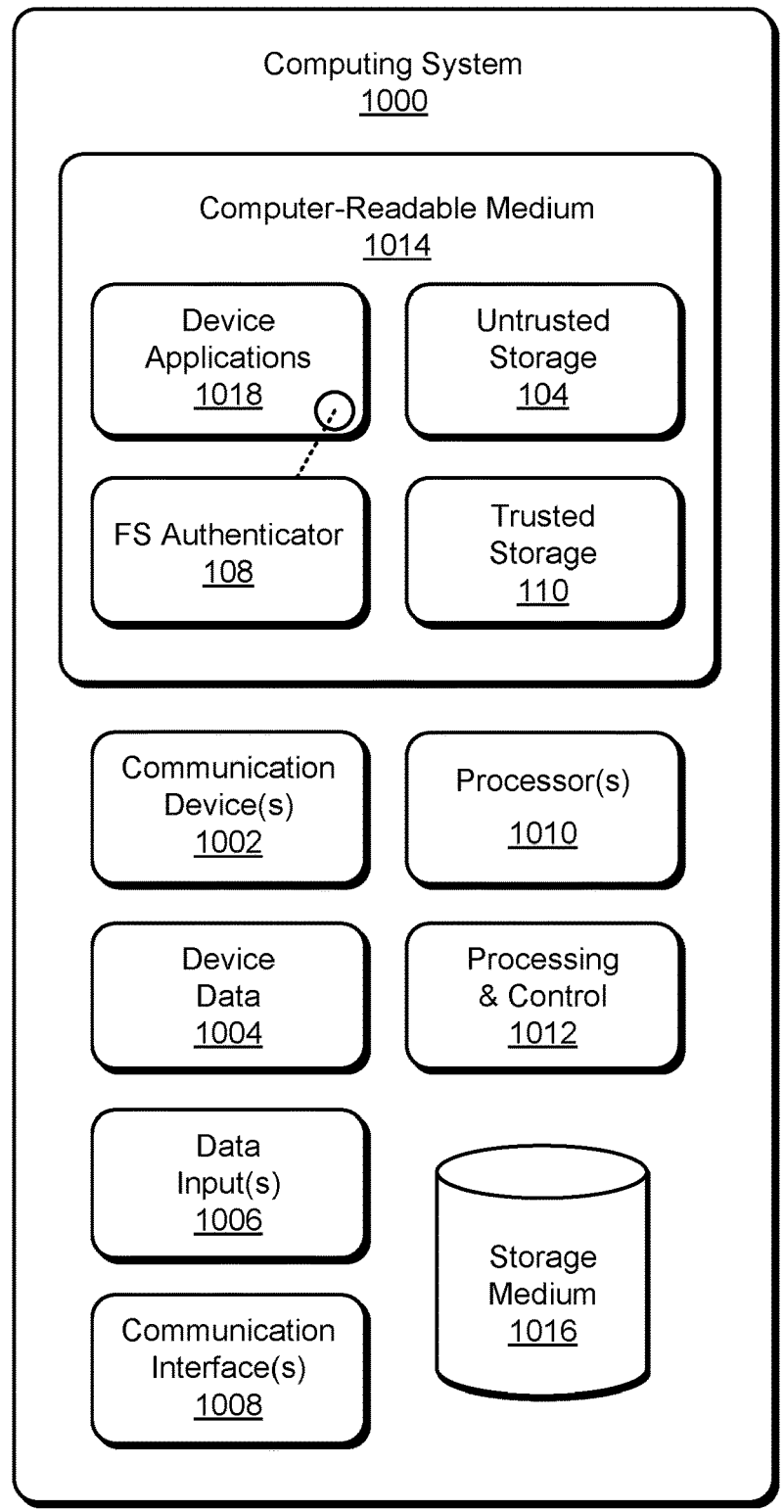
FIG. 10 illustrates an example computing system embodying, or in which techniques may be implemented that enable use of, a file-system authenticator and trusted storage capable of authenticating a file system within untrusted storage.

FIG. 10 illustrates various components of an example computing system 1000 that can be implemented as any type of client, server, and/or computing device as described with reference to the previous FIG. 2 to authenticate a file system within untrusted storage.

The computing system 1000 includes communication devices 1002 that enable wired and/or wireless communication of device data 1004 (e.g., received data, data that is being received, data scheduled for broadcast, or data packets of the data). The device data 1004 or other device content can include at least a portion of the file system 112 (e.g., the write data 306 or the read data 322 of FIG. 3-1). Media content stored as part of the file system 112 can include any type of audio, video, and/or image data. The computing system 1000 includes one or more data inputs 1006 via which any type of data, media content, and/or inputs can be received, such as human utterances, user-selectable inputs (explicit or implicit), messages, music, television media content, recorded video content, and any other type of audio, video, and/or image data received from any content and/or data source.

The computing system 1000 also includes communication interfaces 1008, which can be implemented as any one or more of a serial and/or parallel interface, a wireless interface, any type of network interface, a modem, and as any other type of communication interface. The communication interfaces 1008 provide a connection and/or communication links between the computing system 1000 and a communication network by which other electronic, computing, and communication devices communicate data with the computing system 1000.

The computing system 1000 includes one or more processors 1010 (e.g., any of microprocessors, controllers, and the like), which process various computer-executable instructions to control the operation of the computing system 1000 and to enable techniques for, or in which can be embodied, gesture recognition in the presence of saturation. Alternatively or in addition, the computing system 1000 can be implemented with any one or combination of hardware, firmware, or fixed logic circuitry that is implemented in connection with processing and control circuits which are generally identified at 1012. Although not shown, the computing system 1000 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computing system 1000 also includes at least one computer-readable medium 1014, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. The disk storage device may be implemented as any type of magnetic or optical storage device, such as a hard disk drive, a recordable and/or rewriteable compact disc (CD), any type of a digital versatile disc (DVD), and the like. The computing system 1000 can also include a mass storage media device (storage media) 1016.

The computer-readable medium 1014 provides data storage mechanisms to store the device data 1004, as well as various device applications 1018 and any other types of information and/or data related to operational aspects of the computing system 1000. For example, an operating system (not shown) can be maintained as a computer application with the computer-readable medium 1014 and executed on the processors 1010. The device applications 1018 may include a device manager, such as any form of a control application, software application, signal-processing and control module, code that is native to a particular device, a hardware abstraction layer for a particular device, and so on.

The device applications 1018 also include any system components, engines, or managers for file-system authentication. In this example, the device application 1018 includes the file-system authenticator 108 (FS authenticator 108) of FIGS. 1 to 3-1.

The computer-readable medium 1014 also includes the untrusted storage 104 and the trusted storage 110.

Some examples are described below:

Example 1: a method comprising: accepting write data comprising at least a portion of a file system, the portion of the file system having a structure and at least one file; generating a file-system root hash based on the structure of the file system and content of the at least one file; storing the file-system root hash within trusted storage; and writing the write data to untrusted storage, the untrusted storage comprising the file system.

Example 2: the method of example 1, wherein the generating of the file-system root hash comprises: generating a file root hash of the at least one file; generating a file-system summary file based on the structure of the portion of the file system and the file root hash of the at least one file; and generating the file-system root hash based on a root hash of the file-system summary file.

Example 3: the method of example 2, further comprising: prior to generating the root hash of the file-system summary file, storing a version number associated with the file system within the file-system summary file.

Example 4: the method of example 2 or 3, wherein the file-system summary file comprises a JavaScript Object Notation (JSON) file or a text file.

Example 5: the method of any one of examples 2-4, further comprising storing the file-system summary file within the untrusted storage.

Example 6: the method of example 5, further comprising prior to storing the file-system summary file, encrypting the file-system summary file with a private key, wherein the trusted storage comprises the private key.

Example 7: the method of example 1, wherein: the at least one file comprises multiple files; and the generating of the file-system root hash comprises: generating respective file root hashes of the multiple files; determining a branch structure of a Merkle tree based on the structure of the file system; and generating the file-system root hash using the Merkle tree.

Example 8: the method of any preceding claim, further comprising: accessing the untrusted storage; authenticating the file system within the untrusted storage using the file-system root hash; and responsive to authenticating the file system, reading at least another portion of the file system.

Example 9: the method of any preceding claim, further comprising accepting a signing key, wherein the writing the write data to the untrusted storage comprises prior to writing the write data, encrypting the write data using the signing key.

Example 10: at least one computer-readable medium comprising computer-executable instructions that, responsive to execution by a processor, perform the methods of examples 1-9.

Example 11: the computer-readable medium of example 10, wherein the computer-readable medium comprises the trusted storage.

Example 12: the computer-readable medium of example 10 or 11, wherein the computer-readable medium comprises the untrusted storage.

Example 13: a system comprising: trusted storage; untrusted storage; and a file-system authenticator configured to perform the methods of examples 1-9

Example 14: the system of example 13, wherein the trusted storage has a memory size less than one hundred bytes.

CONCLUSION

Although implementations of techniques for, and apparatuses or systems enabling, authentication of a file system within untrusted storage have been described in language specific to features and/or methods, it is to be understood that the subject of the appended claims is not necessarily limited to the specific features or methods described. Rather, the specific features and methods are disclosed as example implementations for authenticating a file system within untrusted storage.

What is claimed is:

1. A computer-implemented method comprising:
accepting write data comprising at least a portion of a file system, the portion of the file system having a structure and at least one file; generating a file-system root hash based on the structure of the file system and content of the at least one file; storing the file-system root hash within trusted storage; and
writing the write data to untrusted storage, the untrusted storage comprising the file system,
wherein the at least one file is stored within the untrusted storage.

2. The method of claim 1, wherein the generating of the file-system root hash comprises:
generating a file root hash of the at least one file;
generating a file-system summary file based on the structure of the portion of the file system and the file root hash of the at least one file; and generating the file-system root hash based on a root hash of the file-system summary file.

3. The method of claim 2, further comprising:
prior to generating the root hash of the file-system summary file, storing a version number associated with the file system within the file-system summary file.

4. The method of claim 2, wherein the file-system summary file comprises a JavaScript Object Notation (JSON) file or a text file.

5. The method of claim 2, further comprising storing the filesystem summary file within the untrusted storage.

6. The method of claim 5, further comprising prior to storing the file-system summary file, encrypting the file-system summary file with a private key, wherein the trusted storage comprises the private key.

7. The method of claim 1, wherein:
the at least one file comprises multiple files; and the generating of the file-system root hash comprises:
generating respective file root hashes of the multiple files;
determining a branch structure of a Merkle tree based on the structure of the file system;
and generating the file-system root hash using the Merkle tree.

8. The method of claim 1, further comprising:
accessing the untrusted storage;
authenticating the file system within the untrusted storage using the file-system root hash;
and responsive to authenticating the file system, reading at least another portion of the file system.

9. The method of claim 1, further comprising accepting a signing key, wherein the writing the write data to the untrusted storage comprises prior to writing the write data, encrypting the write data using the signing key.

10. At least one computer-readable medium comprising computer-executable instructions that, responsive to execution by a processor, perform operations comprising:
accepting write data comprising at least a portion of a file system, the portion of the file system having a structure and at least one file; generating a file-system root hash based on the structure of the file system and content of the at least one file; storing the file-system root hash within trusted storage; and
writing the write data to untrusted storage, the untrusted storage comprising the file system,
wherein the at least one file is stored within the untrusted storage.

11. The computer-readable medium of claim 10, wherein the computer-readable medium comprises the trusted storage.

12. The computer-readable medium of claim 10 or 11, wherein the computer-readable medium comprises the untrusted storage.

13. A system comprising:
trusted storage; untrusted storage; and a file-system authenticator configured to perform operations comprising:
accepting write data comprising at least a portion of a file system, the portion of the file system having a structure and at least one file; generating a file-system root hash based on the structure of the file system and content of the at least one file; storing the file-system root hash within trusted storage; and
writing the write data to untrusted storage, the untrusted storage comprising the file system, wherein the at least one file is stored within the untrusted storage.

14. The system of claim 13, wherein the trusted storage has a memory size less than one hundred bytes.

\* \* \* \* \*